United States Patent
Robertson et al.

(10) Patent No.: US 7,439,902 B2
(45) Date of Patent: Oct. 21, 2008

(54) RADAR CONTROLLED AUTOMATIC TARGET ILLUMINATION SYSTEM

(75) Inventors: Glen E Robertson, Sarasota, FL (US); John L Webster, Huntsville, AL (US)

(73) Assignee: Glen E. Robertson, Sarasota, FL (US)

( * ) Notice: Subject to any disclaimer, the term of this patent is extended or adjusted under 35 U.S.C. 154(b) by 0 days.

(21) Appl. No.: 11/642,166

(22) Filed: Dec. 20, 2006

(65) Prior Publication Data

US 2008/0150791 A1  Jun. 26, 2008

(51) Int. Cl.
*G01S 13/04* (2006.01)
(52) U.S. Cl. .......................................... 342/41; 342/147
(58) Field of Classification Search .................... 342/41, 342/147, 61, 27
See application file for complete search history.

(56) References Cited

U.S. PATENT DOCUMENTS

| | | | |
|---|---|---|---|
| 3,660,846 A | 5/1972 | Anderson | |
| 3,955,195 A * | 5/1976 | Greene | ........................ 342/136 |
| 4,290,043 A * | 9/1981 | Kaplan | ........................ 367/909 |
| 5,111,210 A * | 5/1992 | Morse | ........................ 342/41 |
| 5,504,477 A * | 4/1996 | Whitright et al. | ............. 342/61 |
| 5,729,016 A | 3/1998 | Klapper et al. | |
| 6,126,299 A | 10/2000 | Hypes et al. | |
| 6,380,871 B1 | 4/2002 | Kaplan | |
| 6,515,614 B2 * | 2/2003 | Sakai et al. | ................... 342/61 |
| 6,903,676 B1 * | 6/2005 | Frady et al. | ................... 342/52 |
| 6,933,900 B2 * | 8/2005 | Kitamori et al. | ............ 343/713 |
| 2007/0091609 A1 * | 4/2007 | Solberg et al. | .............. 362/287 |

* cited by examiner

*Primary Examiner*—Dan Pihulic
(74) *Attorney, Agent, or Firm*—Charles J. Prescott

(57) ABSTRACT

A radar controlled automatic target illumination system for marine and other moving vessels. A radar system operably connected to the vessel produces an electronic signal corresponding to an azimuth of a target relative to, and in proximity to the vessel. An array of lights are connected to the vessel, each light being aimed outwardly in a different lighting sector, the sectors being adjacent one to another around the vessel, each of said lights, when automatically activated, illuminating one lighting sector. An electronic processor is operably connected between the radar system and the array of lights for the automatic selective activation of one or more of the lights to illuminate the target within a corresponding lighting sector which the radar system has identified.

11 Claims, 7 Drawing Sheets

SIMPLIFIED FLOW CHART FOR RADAR AUTOMATIC TARGET ILLUMINATION SYSTEM

RADAR CONTROLLED AUTOMATIC TARGET ILLUMINATION SYSTEM

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to vehicle directional safety lighting systems and devices for illuminating nearby targets with a searchlight or spotlight to assist the helmsman in guiding his vessel safely.

2. Description of Related Art

Technology growth has brought many new capabilities to improve boating safety. The cost of these new capabilities has continued to drop and is now allowing the small boat owner to have high technology products that previously were only available to military and commercial ships or Yachts of wealthy owners. A prime example has been marine radar, first used by the military then by large commercial ships; next by larger fishing boats and yachts and now by small private boat owners. As this marine radar market grew, new features were added following the same trend. The pertinent example of this is Automatic Target Tracking first developed for the military and now available for the small boat operator. ARPA (Automatic Radar Plotting Aid) is now available as MARPA (Mini Automatic Radar Plotting Aid) at prices below $1000.

Another pertinent technology has been the incorporation of data networks on boats. The NMEA 0183 standard serial data network was introduced to allow a variety of marine sensors to communicate with each other via a common data link. NMEA2000 (another serial data link) and Ethernet style LANS (Local Area Networks) are now in use on small vessels.

Vessels equipped with a marine radar and MARPA can provide data on these networks to be used by other instruments such as the device which will be described in this patent application. When a vessel is maneuvering at night and in tight quarters, utilizing radar as the primary sensor, it is often highly desirable to illuminate nearby targets with a searchlight or spot light to assist the helmsman in guiding his vessel safely. The present invention provides an Automatic Target Illumination System to achieve this function.

Although watercraft are typically provided with a rotatable light beam mechanism for spotting such targets in the dark to aid in navigation and to avoid collision therewith, an operator manually directing the rotational position of such light beams is very limited in their effectiveness of illuminating such targets simply because the operator does not have an initial indication of the general direction in which to point the light beam.

U.S. Pat. No. 3,660,846 to Anderson teaches a radar collision warning system for ships providing an audio and/or visual alarm upon the identification of an object within a predetermined range of a vessel. A fixed radar principally for use on sailboats providing a continuous forward looking beam and dual range display with limited azimuth information is disclosed in U.S. Pat. No. 3,955,195 to Greene. The indicator lights in the '195 patent represent a different target range and are excited in accordance with video signals received.

Kaplan, in U.S. Pat. Nos. 4,290,043 and 6,380,871, discloses an above-the-water system and method for finding targets in a marine environment. An optical transmitter transmits infrared and UV light beams toward different zones of coverage on the water and an optical receiver detects return target reflections.

A night vision system utilizing an infrared camera and installable onto a marine vessel is disclosed in U.S. Pat. No. 5,729,016 to Klapper, et al. The system provides visibility in conditions of darkness, smoke, haze and bad weather. Hypes, et al. teach a laser light navigational safety system with safety lighting for use in low visibility conditions in U.S. Pat. No. 6,126,299.

BRIEF SUMMARY OF THE INVENTION

This invention is directed to a radar controlled automatic target illumination system for marine and other moving vessels such as commercial aircraft. A radar system operably connected to the vessel produces an electronic signal corresponding to an azimuth of a target relative to, and in proximity to the vessel. An array of lights are connected to the vessel, each light being aimed outwardly at a different azimuth adjacent one to another around the vessel, each of said lights selectively illuminating one lighting sector. An electronic processor is operably connected between the radar system and the array of lights for selective activation of one or more of the lights to illuminate a target within a corresponding lighting sector identified by the radar system.

It is therefore an object of this invention to provide a radar controlled automatic target illumination system for marine vessels which will automatically identify a target of interest or concern and illuminate that target by activating an appropriately-aimed light within an array of lights to assist the operator of the vessel during nighttime operations.

Yet another object of this invention is to provide an array of lights connected to a moving vessel which will be selective illuminate one or more lights in a lighting array based upon an incoming radar signal which has identified the location and relative azimuth orientation of one or more above water targets.

Yet another object of this invention is to provide a radar-controlled automatic target illumination system for aircraft which will not only cast a selective light beam onto a moving target such as other aircraft, but will also direct a light beam of high intensity directly at the other aircraft to gain the full attention of the pilot of the other aircraft as to the close proximity of both aircraft one to another.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
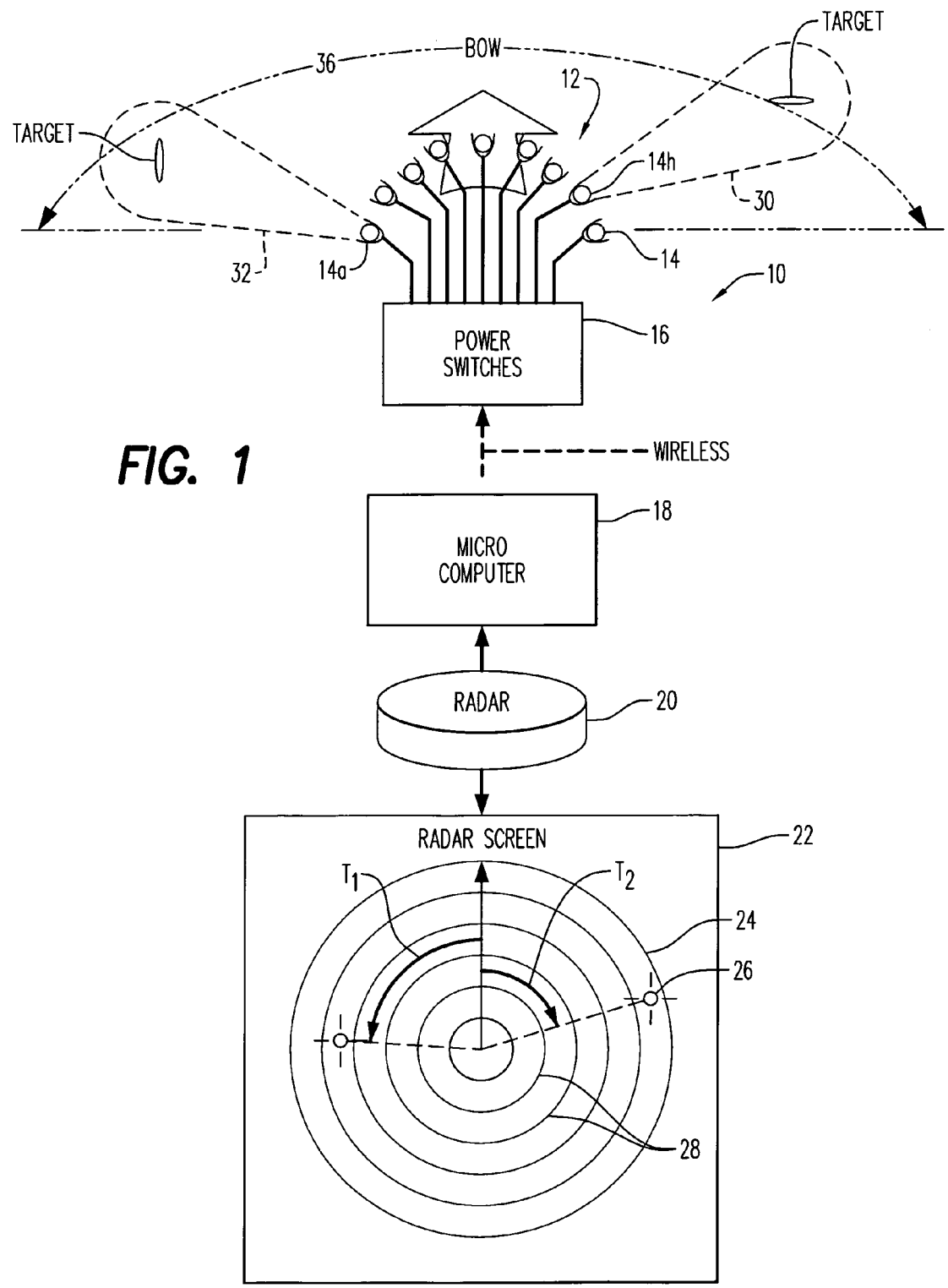
FIG. 1 is a schematic view of the invention.
Figure 2:
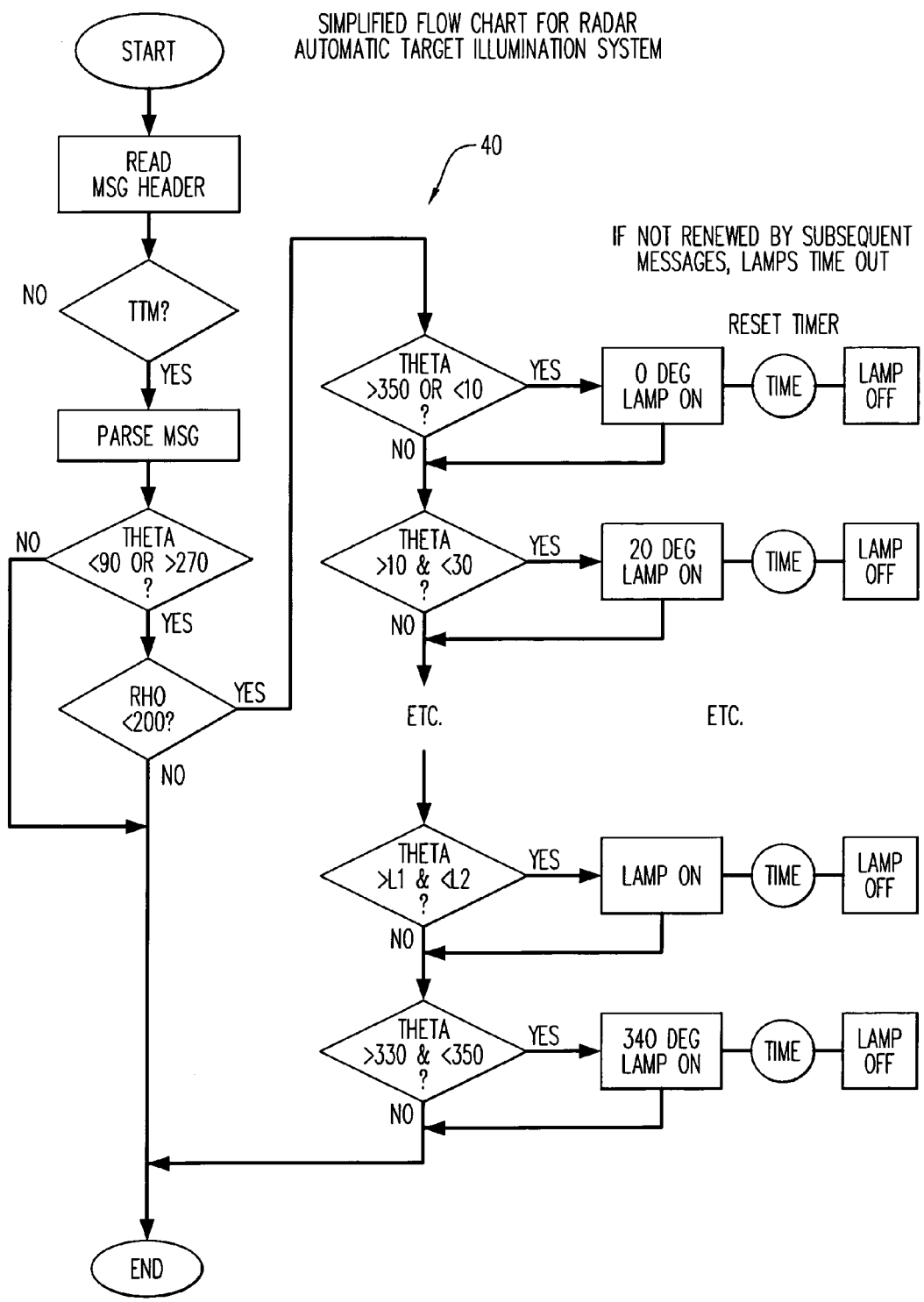
FIG. 2 is a simplified flow diagram of the microcomputer electronic operational circuit within the microcomputer (18) of FIG. 1.

Referring now to the drawings, and firstly to FIGS. 1 and 2, the preferred embodiment of the invention utilized in conjunction with marine vessels or watercraft is there shown generally at numeral 10. This radar-controlled automatic target illumination system 10 includes a radar transmitter/signal receiver 20 typically mounted at an elevated point on the structure of a marine vessel. The radar unit 20 transmits radial signals and receives reflected signals back identifying above-water targets in a conventional manner and displays those reflected target signals on a visual display 22 viewable by the operator of the marine vessel. The screen 24 will display each of the targets shown typically at 26 and will also typically include distance estimates in the form of distance positioning within concentric rings 28 marked on the viewing screen 24. A relative bearing or azimuth angle $T_1$, $T_2$, $T_3$ ... may also be shown or measurable from the screen 24.

A most important aspect of the utilization of a radar-produced signal is that it affords the viewable indicia of the azimuth $T_1$, $T_2$, $T_3$ ... of each of the targets 26 relative to the direction of travel of the marine watercraft. Each of these target signals 26 is electronically fed into a microcomputer 18, the typical circuitry of which is shown in FIG. 2. This IC circuit 40 will produce one or more output control signals (Theta) which will each then control one power switch located at 16 for selectively illuminating one or more of the outwardly shining lights 14 of an array of lights 12.

Each of these lights 14 produces a light beam shown typically at 30 and 32 having a predetermined beam width of preferably in the range of about 20°. The array 12 of lights 14 is arranged in a predetermined support housing described briefly herebelow which fixedly aim each of these lights 14 so that the width of each light beam 30, 32, etc. are oriented either closely in side-by-side orientation or slightly overlapping orientation to collectively define an overall lighting sector 36 which, in this embodiment 10 is approximately 180°. Again, note that each of the individual lighting sectors 30, 32, etc. have an azimuth width of about 20° so that, collectively each of the nine lights 14 define the overall lighting sector 36 to be approximately 180°. To achieve target lighting aloft of a beam of the vessel, lighting sector 36 may be increased to e.g. 220° by adding two additional lights 14 to the array 12.

The array 12 of lights 14 are rigidly mounted on the vessel to provide individually automatically selectable sectors of illumination, e.g. light sector 30 from light 14h and light sector 32 from light 14a. As an example, an array of nine fixed spot lights, each covering a sector of approximately 20 degrees would provide selectable illumination of any targets located directly ahead or in the forward port or starboard quarter of interest. The microcomputer 18 is utilized to receive data of interest from the common serial data link network 40. An example would be the NMEA Tracked Target Message (TTM). The microcomputer 18 would monitor the network 40 and extract all TTM sentences or data packets. These data packets are then parsed and obtain the range (Rho) and bearing (Theta) information. Those data are then screened for targets of interest, those being targets with Theta in the forward vectors both port and starboard and those with Rho being within the selectable illumination range of the installed lights 14. The microcomputer 18 would then select and energize the appropriate light or lights 14 to automatically illuminate those targets meeting the programmed criteria. Each light 14 is de-energized by a timer if not reactivated by subsequent messages.

Figure 3:
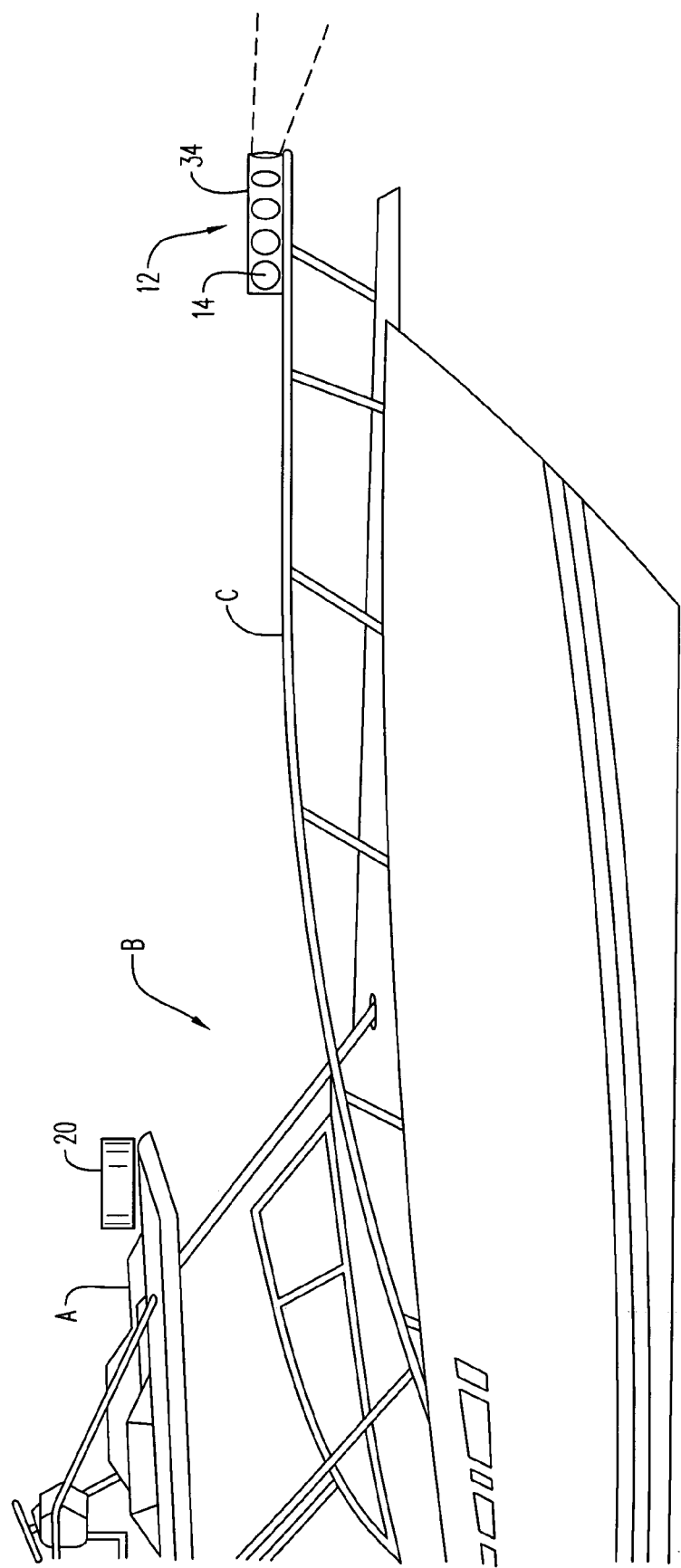
FIG. 3 is a side elevation simplified view of the invention attached to the bow rail of a marine vessel.

In FIG. 3, another marine vessel B is there shown having a hard roof A for supporting the radar transmitting and receiving mechanism 20. The target illumination system 12 is mounted atop the forwardly-most portion of the bow rail C to maximize the lighting efficiency of the lights 14 mounted within the housing 34 as previously described and to reduce back glare. Note that the light beams are also preferably angled downwardly ten to twenty degrees to further reduce back glare and to reflect off the water surface to enhance target illumination.

Figure 4:
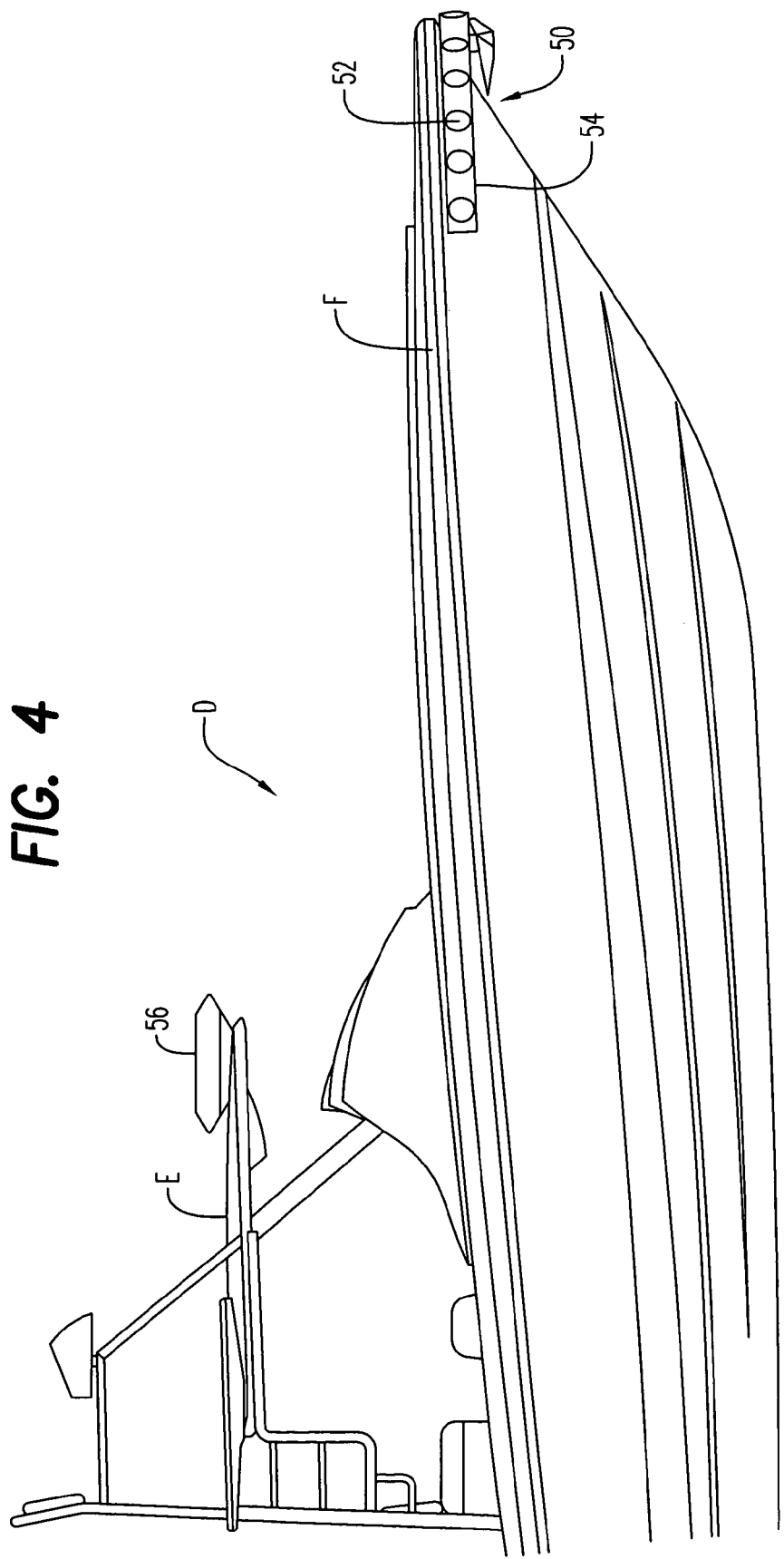
FIG. 4 is another embodiment of the invention shown connected beneath the gunnel of the bow of a watercraft to reduce back glare into the eyes of the operator of the marine vessel.

In FIG. 4, another embodiment of a marine watercraft is shown generally at numeral D which also includes a hard roof E for supporting the radar transmitting and receiving mechanism 56. In this embodiment 50, the housing 54 which supports the individual lights 52 of the array of lights is mounted beneath the forwardly most portion of the gunnel F so that the back glare into the eyes of the vessel operator is minimized.

Figure 5:
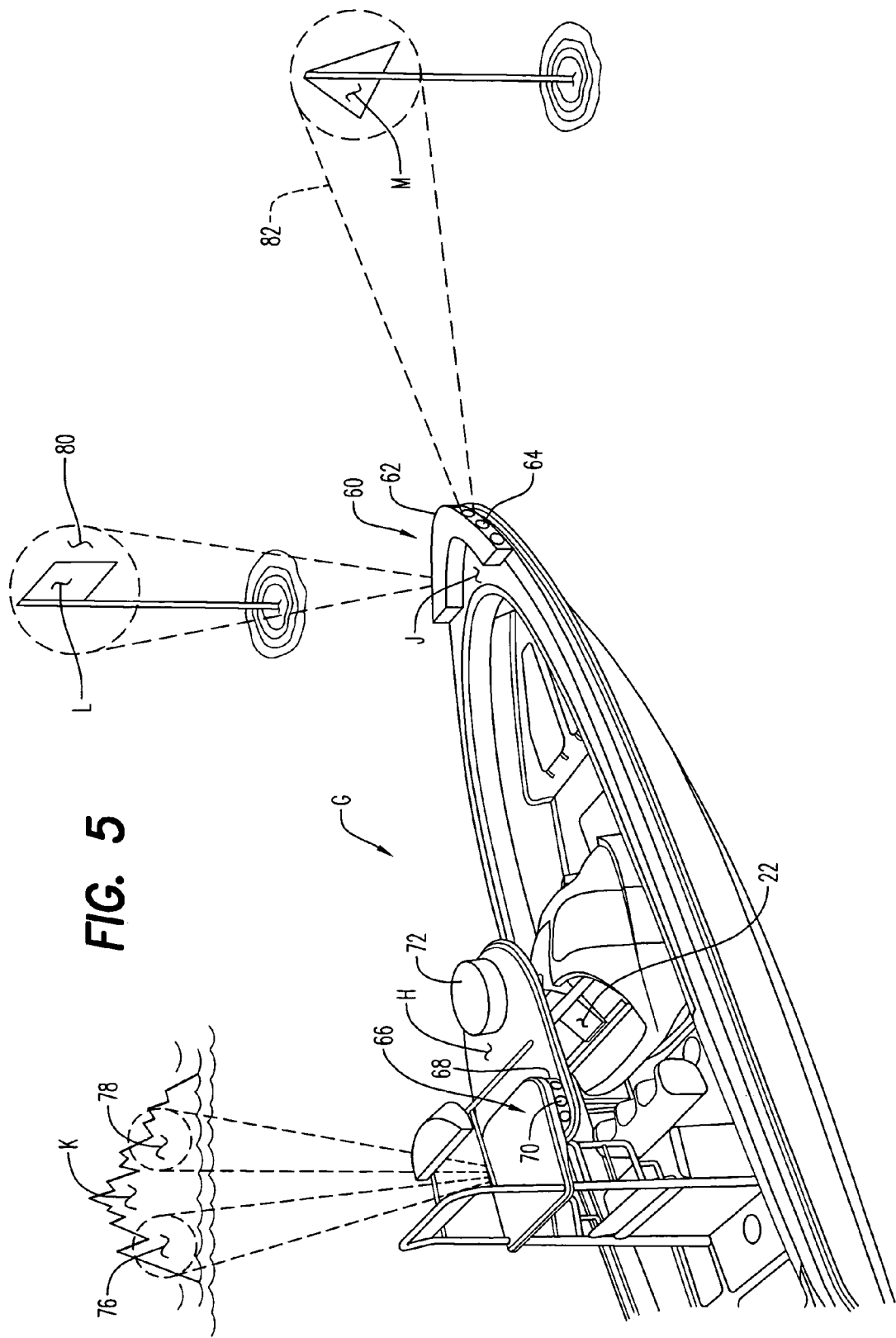
FIG. 5 is a perspective view of another embodiment of the invention illuminating several above-water targets around the watercraft.

A pictorial view of the invention in use is shown in FIG. 5 wherein another marine vessel G having hard roof H supporting the radar mechanism 72 is there shown. A bow mounted target illumination system 60 is mounted onto the bow surface J. The housing 62 supports the array of lights 64 each of which are each fixedly aimed having a different lighting sector as previously described.

The radar 72 will detect targets K, L and M and, via the microcomputer 18 and control switches 16, will activate the appropriate light 64 to illuminate the above-water targets L and M. However, an additional target illumination system 66 disposed on either rear corner of the hard roof H may also be provided. Each of these lights 70 within the corresponding housing 68 will be aimed to define a lighting sector which is abeam or rearwardly of a transverse line of the vessel G. Thus, the targets in addition to being displayed on the viewing screen 22 as previously described, will also be automatically illuminated within one or more of the lighting sectors 76, 78, 80 or 82 to assist the operator of the vessel G in maintaining a proper course such as between channel markers L and M and in avoiding a collision with above-water obstacles K.

Figure 6:
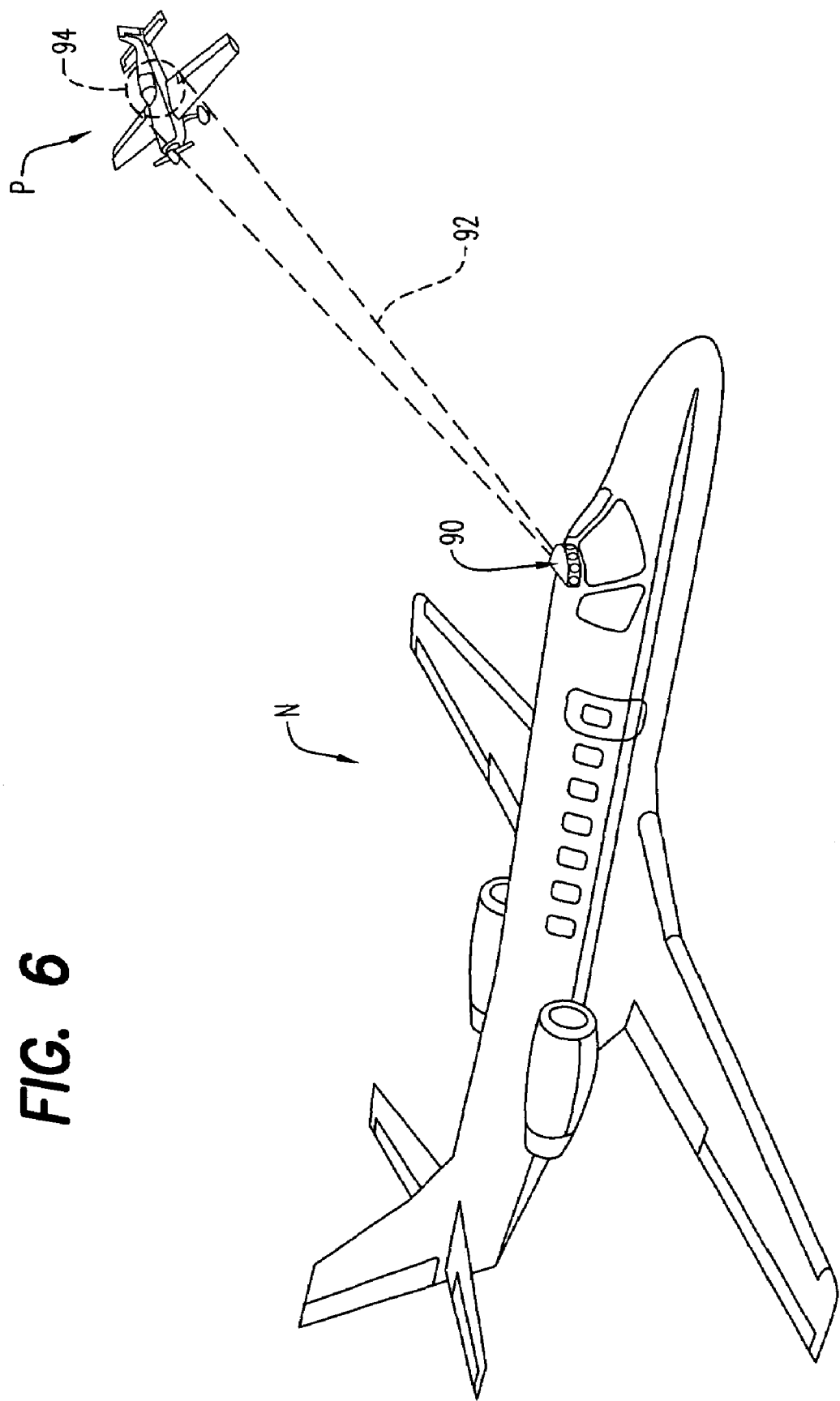
FIG. 6 is a pictorial view of an aircraft embodiment of the invention.

Referring now to FIG. 6, an embodiment of the invention associated with commercial aircraft is there shown wherein the aircraft N is equipped or is capable of being equipped with a radar system (not shown). The target illumination system 90 will function as previously described, illuminating a target P in this case being another aircraft within the range and azimuth sector of control of the lighting system 90. The automatically selected beam 92 will not only illuminate the other aircraft P at 94, but will also provide an additional viewable signal by the pilot of the other aircraft P of the presence of the commercial aircraft N. Moreover, there will be little if any intended declination or inclination of the projected lighting sector 92 as a main risk of collision is between two aircraft which are generally at the same elevation above ground.

Figure 7:
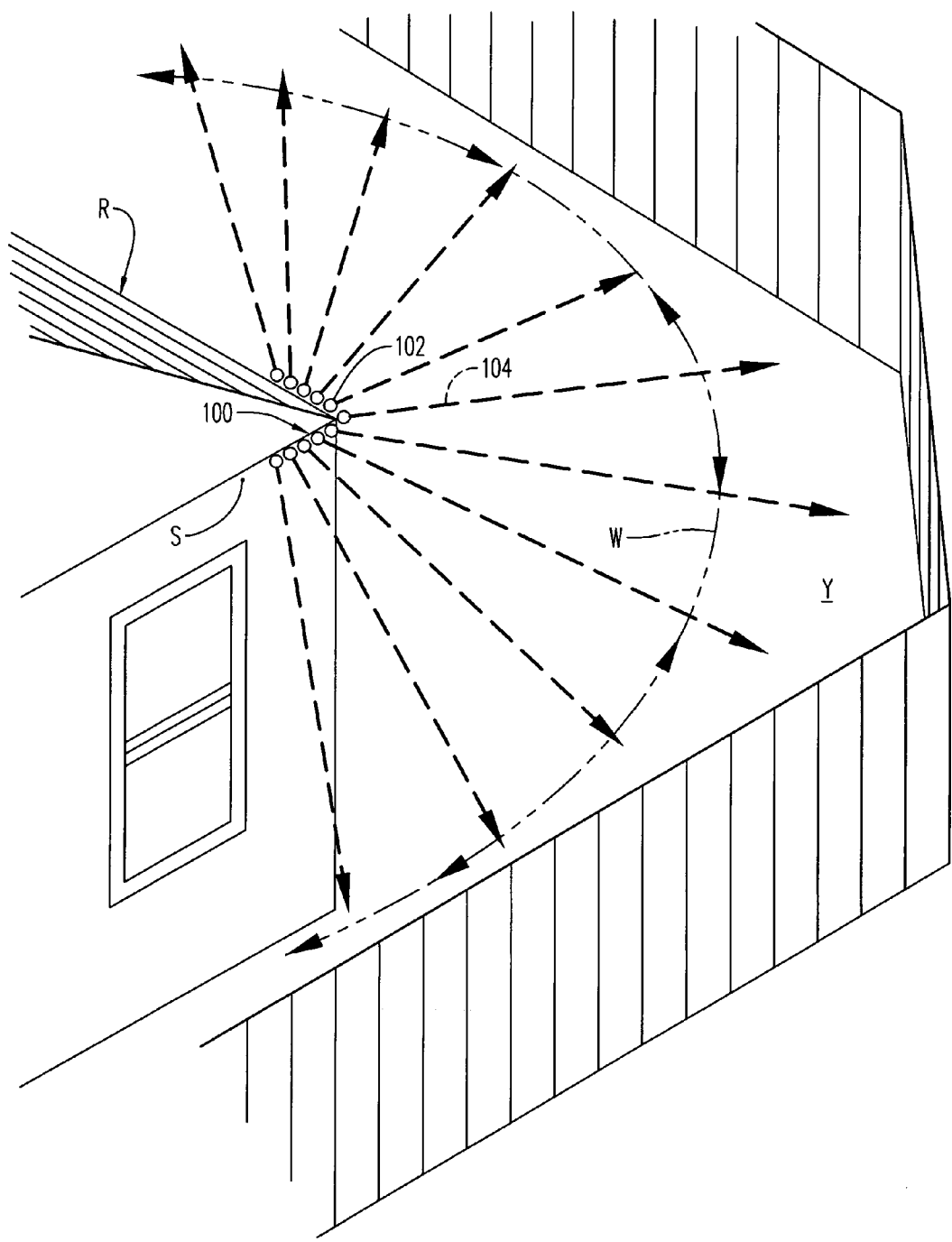
FIG. 7 is a pictorial view of a home protection embodiment of the invention.

Referring now to FIG. 7, an embodiment of the invention associated with nighttime protection of a residential home R is there shown. The target illumination system 100 includes an array of narrowed beam directed lights 102 each aimed in a particular lighting sector as previously described, the centerlines of which are shown typically at numeral 104. The target (not shown) would be an intruder within, for example, the yard Y adjacent to a corner of the home R. The array of lights 100, positioned along the eave S at, for example, the corner of the home R, will have selected ones of the lights 102 activated as determined preferably by a radar system (not shown as previously) responsive to an intruder within the yard or grounds Y. As an intruder would move, for example, along a path W, selected ones of the lights 102 would be illuminated, tracking the intruder as he prowls within the yard Y.

The obvious benefit to such a system 100 would be that the intruder would likely be befuddled when being tracked by the array of lights 102, likely believing that his presence has been detected and that he is being tracked by a person operating the lighting system 100. An alternate means for sensing the presence of an intruder may be a motion detector as fixed non-targets such as trees, bushes, could defeat the utility of radar.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A radar controlled automatic target illumination system for a marine vessel comprising:
   a radar system operably connected to the vessel for producing an electronic signal corresponding to an azimuth of an above-water target relative to, and in proximity to the vessel;
   an array of lights connected to a bow of the vessel, each light of said array aimed outwardly in a different azimuth sector to define an overall lighting sector of up to about 180°;
   the azimuth sectors being adjacent one to another, each of said lights selectively illuminating an above-water individual lighting sector;
   a processor operably connected between said radar system and said array of lights for automatic selective activation of one or more of said lights to illuminate the target within a corresponding said lighting sector within which said radar system has identified the presence of the target.

2. A radar controlled automatic target illumination system for a moving vessel comprising:
   a radar system operably connected to the vessel for producing an electronic signal corresponding to an azimuth of a target relative to, and in proximity to the vessel;
   an array of stationary lights connected to the vessel, each light of said array aimed outwardly in different individual azimuth sectors adjacent one to another to define an overall forward-facing lighting sector of substantially less than 360°, each of said lights selectively illuminating an individual lighting sector;
   a processor operably connected between said radar system and said array of lights for automatic selective activation of one or more of said lights to illuminate the target within a corresponding said lighting sector within which said radar system has identified the presence of the target.

3. A radar controlled automatic target illumination system as set forth in claim 2, wherein:
   said moving vessel is a watercraft.

4. A radar controlled automatic target illumination system as set forth in claim 2, wherein:
   said moving vessel is an aircraft and the target is a second moving aircraft at an elevation generally equal to that of the aircraft.

5. A radar controlled automatic target illumination system as set forth in claim 2, wherein:
   each of said lighting sectors has a lighting sector in the range of 10-30 degrees.

6. A radar controlled automatic target illumination system for a marine vessel comprising:
   a radar system operably connected to the vessel for producing an electronic signal corresponding to an azimuth of an above-water target relative to, and in proximity to the vessel;
   an array of lights connected in proximity to a bow of the vessel, each light of said array aimed outwardly in different azimuth directions adjacent one to another around the vessel, each of said lights selectively illuminating an above-water lighting sector;
   a processor operably connected between said radar system and said array of lights for automatic selective activation of one or more of said lights to illuminate the target within a corresponding said lighting sector within which said radar system has identified the presence of the target.

7. A radar controlled automatic target illumination system as set forth in claim 1, wherein:
   said array of lights is positioned in close proximity to, and beneath a gunnel of the vessel.

8. A radar controlled automatic target illumination system as set forth in claim 2, wherein:
   said overall lighting sector is in a range of up to about 180°.

9. A radar controlled automatic target illumination system as set forth in claim 6, wherein:
   said array of lights is positioned in close proximity to, and beneath a gunnel of the vessel.

10. A radar controlled automatic target illumination system as set forth in claim 6, wherein:
    said array of lights defines an overall lighting sector of substantially less than 360°.

11. A radar controlled automatic target illumination system as set forth in claim 10, wherein:
    said overall lighting sector is up to about 180°.

* * * * *